United States Patent
Seki et al.

(10) Patent No.: US 7,311,171 B2
(45) Date of Patent: Dec. 25, 2007

(54) VEHICULAR SUSPENSION INSTALLATION STRUCTURE

(75) Inventors: Bunzo Seki, Saitama (JP); Shinji Takahashi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 441 days.

(21) Appl. No.: 10/939,392

(22) Filed: Sep. 14, 2004

(65) Prior Publication Data

US 2005/0110264 A1 May 26, 2005

(30) Foreign Application Priority Data

Sep. 17, 2003 (JP) ............................. 2003-325129

(51) Int. Cl.
*B62D 21/02* (2006.01)
*B62D 21/11* (2006.01)

(52) U.S. Cl. ............................. 180/312; 280/124.109; 280/788

(58) Field of Classification Search ..............................
280/124.134–124.136, 124.109, 124.1, 785,
280/788, 781; 180/311, 312; 296/203.01,
296/203.02, 203.04, 204, 205
See application file for complete search history.

(56) References Cited

U.S. PATENT DOCUMENTS

| 2,827,303 | A | * | 3/1958 | Herbenar | 280/124.136 |
| 5,267,751 | A | * | 12/1993 | Hiromoto et al. | 280/124.151 |
| 5,855,250 | A | * | 1/1999 | Nishi | 180/312 |
| 6,799,781 | B2 | * | 10/2004 | Rasidescu et al. | 280/781 |
| 6,866,110 | B2 | * | 3/2005 | Mallette et al. | 180/183 |
| 2004/0100061 | A1 | * | 5/2004 | Adams et al. | 280/124.134 |
| 2005/0110235 | A1 | * | 5/2005 | LaBlanc et al. | 280/124.135 |

FOREIGN PATENT DOCUMENTS

JP         62-216882 A    9/1987

* cited by examiner

Primary Examiner—Paul N. Dickson
Assistant Examiner—Drew J. Brown
(74) Attorney, Agent, or Firm—Birch, Stewart, Kolasch & Birch, LLP (57) ABSTRACT

To enhance productivity by further enhancing the ease of assembly in a main assembly line in a suspension installation structure for a vehicle. Cantilever frames (that is, first inclined frames and lower main frames) that protrude toward the front of a vehicle (or toward the rear of the vehicle) are provided to a body frame. Brackets (that is, an upper bracket, a lower front bracket and a lower rear bracket) are fastened to the cantilever frames by bolts as a fastener.

20 Claims, 10 Drawing Sheets

VEHICULAR SUSPENSION INSTALLATION STRUCTURE

CROSS-REFERENCE TO RELATED APPLICATIONS

This nonprovisional application claims priority under 35 U.S.C. § 119(a) on Patent Application No. 2003-325129, filed in Japan on Sep. 17, 2003, the entirety of which is incorporated herein by reference.

BACKGROUND OF THE INVENTION

1. Field of the Invention

The present invention relates to vehicular suspension installation structure.

2. Description of Background Art

A suspension installation structure for a vehicle is know, in which suspension arms are attached to a body frame via a bracket (for example, refer to JP-A-62-216882).

Figure 9:
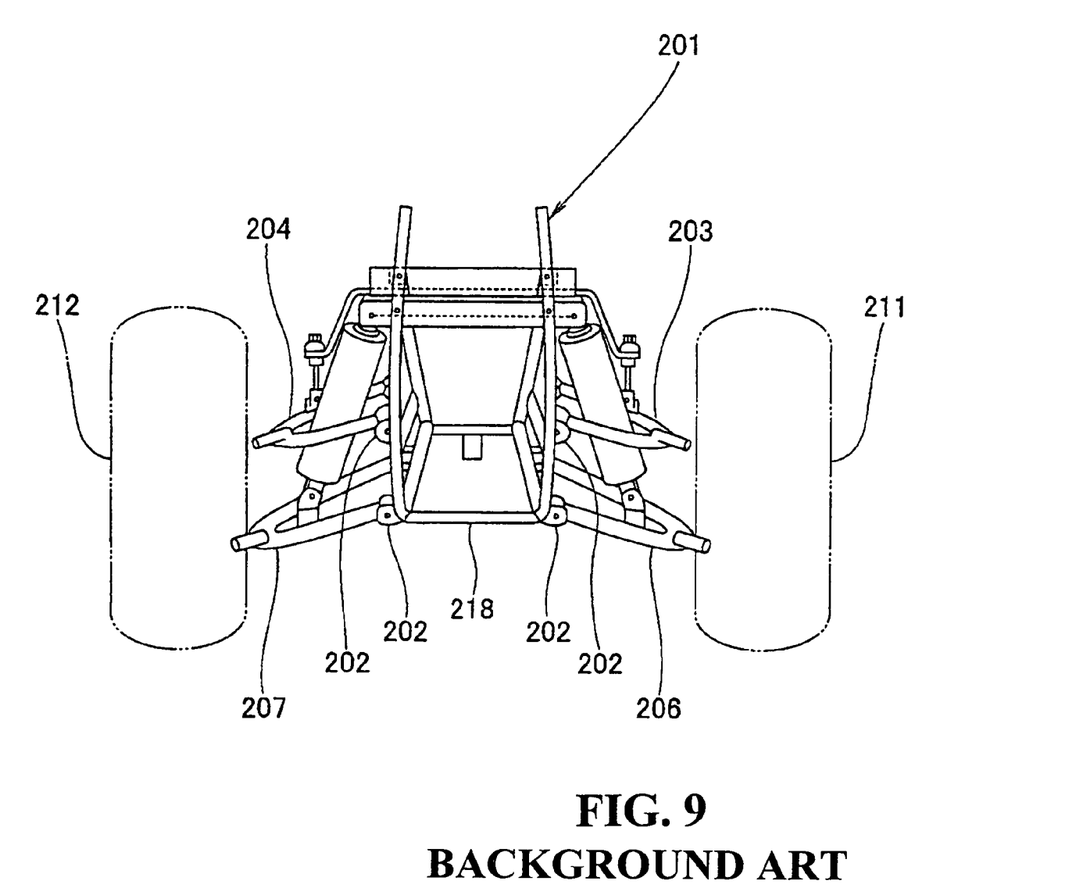
FIG. 9 is a front view showing suspension installation structure of a conventional type vehicle.
Figure 10:
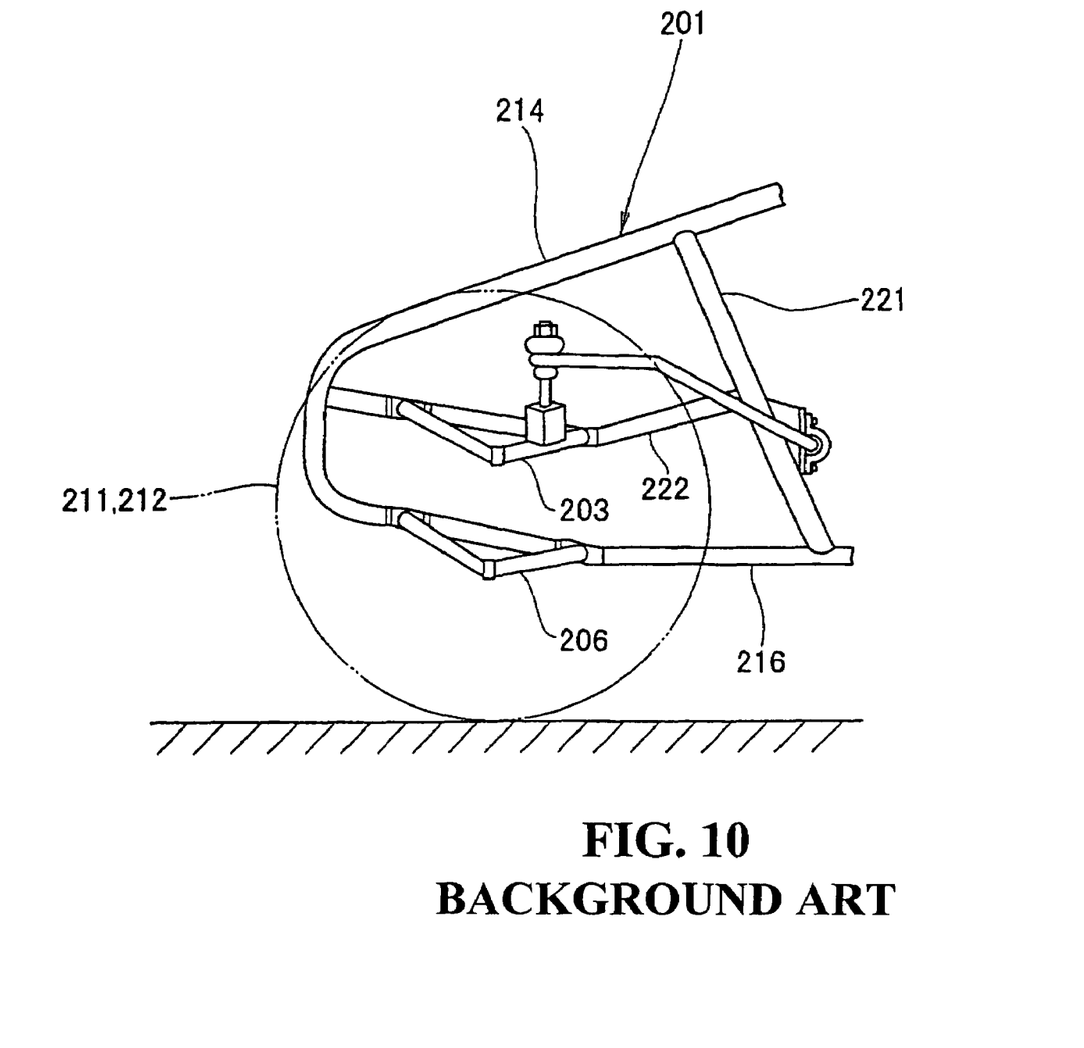
FIG. 10 is a side view showing the suspension installation structure of the conventional type vehicle.

FIGS. 1 and 2 of the above document have been reproduced as FIGS. 9 and 10 of the present invention. However, the reference numerals have been changed.

FIG. 9 is a front view showing suspension installation structure of a vehicle according to the background art, and shows that left and right upper suspension arms 203, 204 and left and right lower suspension arms 206, 207 are attached to a frame 201 via brackets 202. Left and right front wheels 211, 212 are attached to the side of each end of the left and right upper suspension arms 203, 204 and the left and right lower suspension arms 206, 207.

FIG. 10 is a side view showing the suspension installation structure of the vehicle according to the background art. A front part of the frame 201 is composed of left and right ends 214, 215 of upper tubes (only the reference number 214 on this side is shown). Left and right ends 216, 217 of lower tubes are coupled below the ends 214, 215 (only the reference number 216 on this side is shown). A bridge tube 218 (see FIG. 9) extends between the ends 214, 215 of the left and right upper tubes. Bridge tubes 221, 221 (only the reference number 221 on this side is shown) extend between the ends 214 and 216 and between the ends 215 and 217 and bridge tubes 222, 222 (only the reference number 222 on this side is shown) extends between the bridge tube 221 and the end 214 and between the bridge tube 221 and the end 215.

As shown in FIGS. 9 and 10, the upper suspension arms 203, 204 (see FIG. 9) are members attached to the bridge tubes 222, 222 and the lower suspension arms 206, 207 are members attached to the ends 216, 217.

For example, in an assembly shop, to enhance productivity, a method of assembling plural parts beforehand in a subassembly line, preparing some small assemblies and assembling the small assemblies with main component parts flowing on a main assembly line is adopted.

As shown in FIGS. 9 and 10, in case the bracket 202 is fixed to the frame 201 by welding, the brackets 202 are welded to the frame 201 before work on the main assembly line. The left and right upper suspension arms 203, 204 and the left and right lower suspension arms 206, 207 are directly attached to each bracket 202 on the main assembly line.

If the upper suspension arms 203, 204 and the lower suspension arms 206, 207 can be attached to the brackets 202 beforehand, a small assembly of the bracket 202 and each suspension arm is easily assembled with the frame 201 flowing on the main assembly line and the productivity of the main assembly line is enhanced.

Normally, each suspension arm is attached to the frame 201 on the line from the side of the line. However, if a small assembly is required to be attached to the frame 201 from the left and the right, it is difficult to attach the small assembly from the side.

SUMMARY OF THE INVENTION

An object of the present invention is to enhance productivity by enhancing the ease of assembly on a main assembly line in a suspension installation structure for a vehicle.

According to a first aspect of the present invention, a vehicle includes right and left suspension arms attached to a body frame via a bracket. In addition, cantilever frames protrude toward the front of the vehicle or toward the rear of the vehicle. The cantilever frames are provided to the body frame and the bracket is fastened to the cantilever frames by fasteners.

The suspension arms and the bracket are assembled beforehand as a small assembly and then the bracket is fastened to the cantilever frames by the fasteners. In addition, the bracket is attached to the cantilever frames from the side of the vehicle, from the front of the vehicle or from the rear of the vehicle.

According to a second aspect of the present invention, a pair of right and left cantilever frames are provided. In addition, the bracket is a member that extends in a width direction of the body to attach the right and left suspension arms and is attached across the right and left cantilever frames.

The right and left suspension arms are attached to the bracket beforehand and the bracket is attached to the right and left cantilever frames.

According to a third aspect of the present invention, upper and lower cantilever frames are arranged on the left side, upper and lower cantilever frames are arranged on the right side and the upper and lower cantilever frames are coupled by a coupling member.

The coupling member couples the upper and lower cantilever frames and the rigidity of the body frame is secured.

According to a fourth aspect of the present invention, the suspension is a double wishbone type.

A left upper arm and a right upper arm respectively forming a part of the double wishbone type suspension are attached to an upper bracket as a small assembly. A left lower arm and a right lower arm forming a part of the double wishbone type suspension are attached to a lower bracket as a small assembly and the upper bracket and the lower bracket are attached to cantilever frames.

According to the first aspect of the present invention, if the bracket and the suspension arms are assembled beforehand as a small assembly, the small assembly acquired as a result can be easily attached to the body frame. Therefore, the ease of assembly in the main assembly line can be enhanced, and the productivity can be enhanced.

In addition, if the bracket is attached to the cantilever frames, the bracket can be also attached from the front of the vehicle or from the rear of the vehicle in addition to the side of the vehicle. Therefore, the ease of assembly can be further enhanced.

According to the second aspect of the present invention, if the bracket and the right and left suspension arms are assembled beforehand, the small assembly acquired as a result can be attached to the right and left cantilever frames from the front of the vehicle or from the rear of the vehicle. Therefore, the ease of assembly in the main assembly line and the productivity can be further enhanced.

According to the third aspect of the present invention, even if cantilever frame structure is adopted, the rigidity of the body frame can be secured by coupling the upper and lower cantilever frames by the coupling member in addition to coupling the right and left cantilever frames by the bracket. Therefore, the ease of assembly can be enhanced.

According to the fourth aspect of the present invention, the upper arms and the lower arms respectively forming the double wishbone type suspension can be attached to the brackets on the right and on the left as a small assembly. The cantilever frame structure and the double wishbone type suspension are an effective combination in terms of the ease of assembly.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The present invention will now we described with reference to the accompanying drawings, wherein the same or similar elements have been identified by the same reference numeral throughout the several views. The drawings should be viewed in a direction of the orientation of the reference numerals.

Figure 1:
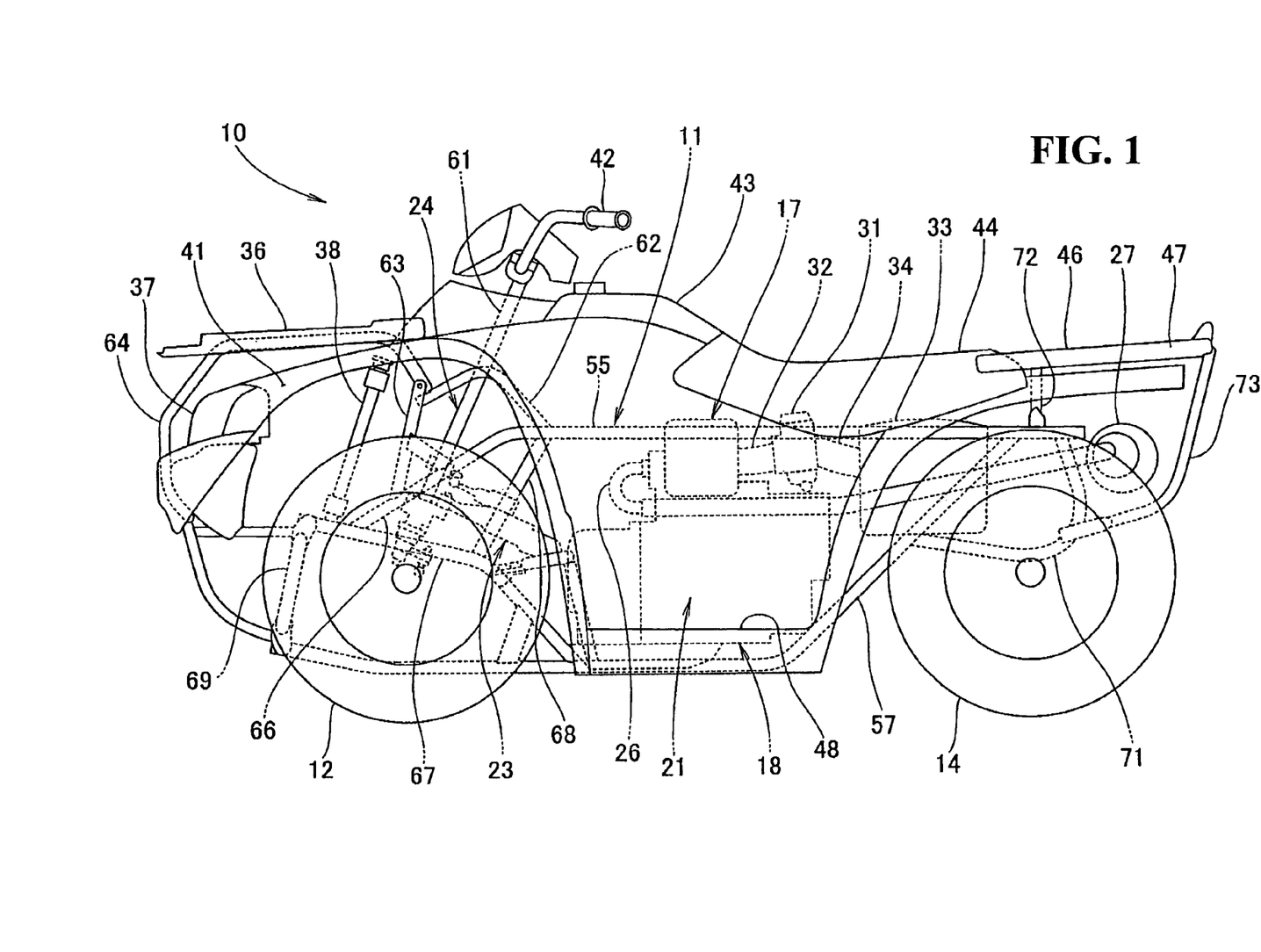
FIG. 1 is a side view showing a vehicle according to an embodiment of the present invention.

FIG. 1 is a side view showing a vehicle according to an embodiment of the present invention. A vehicle for running on an uneven road 10 is illustrated as a four-wheel drive vehicle. Wide front wheels 12, 13 (only the reference number 12 on this side is shown) are mounted in the front of a body frame 11 via a suspension arm (not shown). Wide rear wheels 14, 15 are mounted at the back of the body frame 11 via a suspension arm (not shown). A power unit 21 composed of an engine 17 and a transmission 18 is mounted in the center of the body frame 11. The front wheels 12, 13 and the rear wheels 14, 15 are driven by the power unit 21.

The front wheels 12, 13 are steered by a steering system 24 to which power steering 23 is added. The engine 17 is provided with an exhaust pipe 26 that extends backward from a front thereof and a muffler 27 is connected to the rear end of the exhaust pipe 26.

Reference numeral 31 identifies a carburetor connected to the rear of the engine 17 via an intake pipe 32. Reference numeral 33 identifies an air cleaner connected to the carburetor 31 via a connecting tube 34. Reference numeral 36 identifies a front carrier. Reference numeral 37 identifies a headlamp. Reference numeral 38 identifies a radiator. Reference numeral 41 identifies a front fender. Reference numeral 42 identifies a handlebar. Reference numeral 43 identifies a fuel tank. Reference numeral 44 identifies a seat. Reference numeral 46 identifies a rear carrier. Reference numeral 47 identifies a rear fender. Reference numeral 48 identifies a step.

The body frame 11 is provided with left and right upper main frames 55, 56 that extend longitudinally (only the reference number 55 on this side is shown). Lower main frames 57, 58 (only the reference number 57 on this side is shown) are provided as a cantilever frame, which is arranged below the upper main frames 55, 56 and which is coupled to the rear ends of the upper main frames 55, 56. Substantially L-type frames 62, 62 (only the reference number 62 on this side is shown) are attached to each front of the upper main frames 55, 56 to support an intermediate part of a steering shaft 61 forming the steering system 24. Standing frames 63, 63 (only the reference number 63 on this side is shown) and front frames 64, 64 (only the reference number 64 on this side is shown) are provided for supporting the front carrier 36.

In addition, the body frame 11 is provided with front inclined parts 66, 66 (only the reference number 66 on this side is shown) provided to each front of the upper main frames 55, 56. First inclined frames 67, 67 (only a reference number 67 on this side is shown) are provided as a cantilever frame, which supports a lower part of the steering system 24 by attaching the first inclined frames toward the lower main frames 57, 58. Second inclined frames 68, 68 (only the reference number 68 on this side is shown) are attached to the first inclined frames 67, 67 and the upper main frames 55, 56. Coupling members 69, 69 couple each end of the first inclined frames 67, 67 and the lower main frames 57, 58. Curved frames 71, 71 are attached to each rear end of the upper main frames 55, 56 and each rear of the lower main frames 57 58. Rear first frames 72, 72 (only the reference number 72 on this side is shown) are attached onto each rear end of the upper main frames 55, 56 to support the rear carrier 46. Rear second frames 73, 73 (only the reference number 73 on this side is shown) are attached to the curved frames 71, 71 to support the rear carrier 46.

Figure 2:
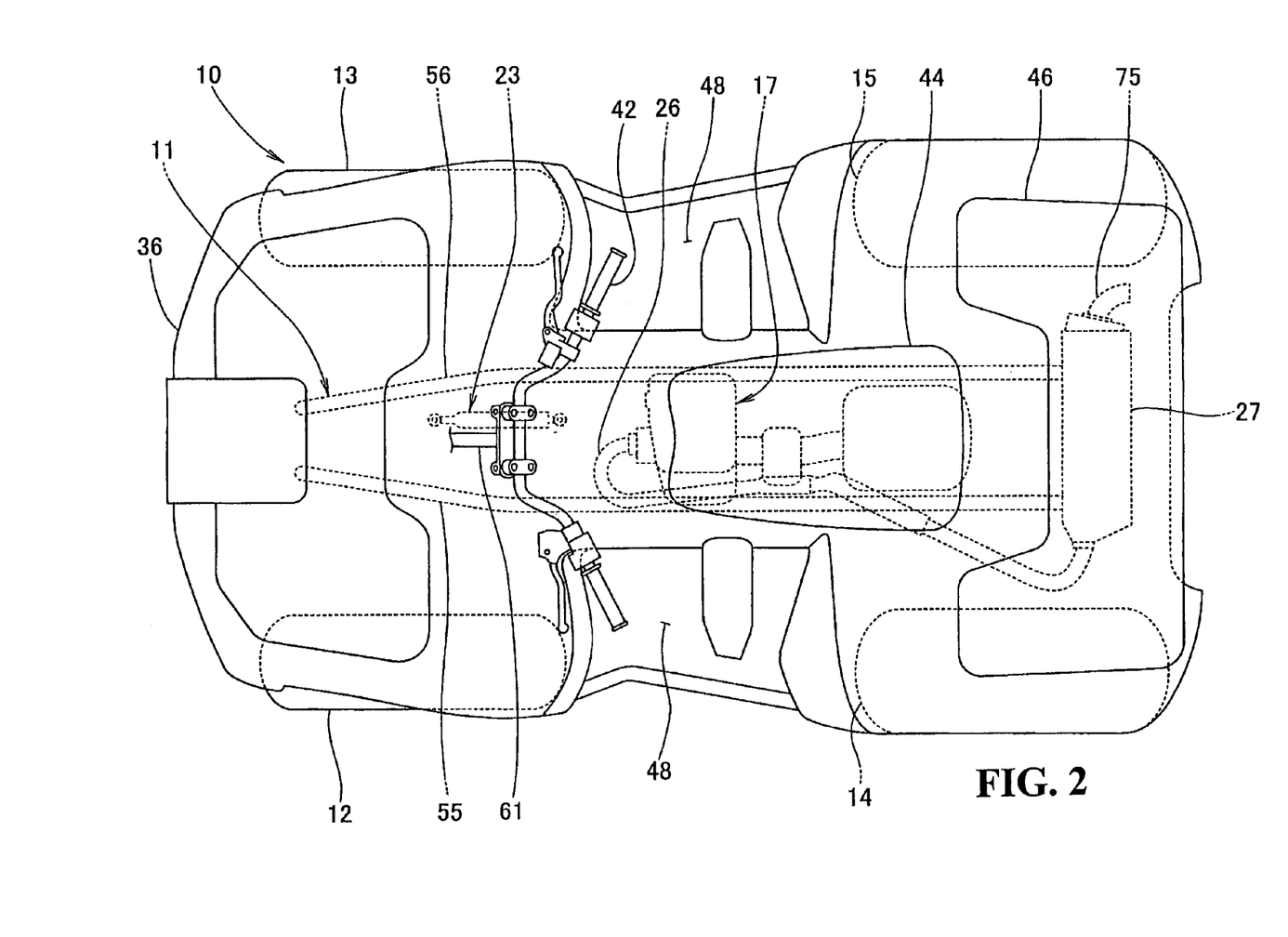
FIG. 2 is a plan view showing the vehicle according to the invention.

FIG. 2 is a plan view showing the vehicle according to the present invention, and shows that the left and right upper main frames 55, 56 forming a part of the body frame 11 extend in a longitudinal direction of the vehicle for running on an uneven road 10. The engine 17 is arranged below the upper main frames 55, 56. The exhaust pipe 26 is curved on the left side of the body from the front of the engine 17, extends backward, extends backward and diagonally leftward and is connected to the muffler 27 arranged in a width direction of the body at the back of the upper main frames 55, 56. The handlebar 42 is attached above the steering shaft 61. Reference numeral 75 identifies a tail pipe attached to the end of the muffler 27.

Figure 3:
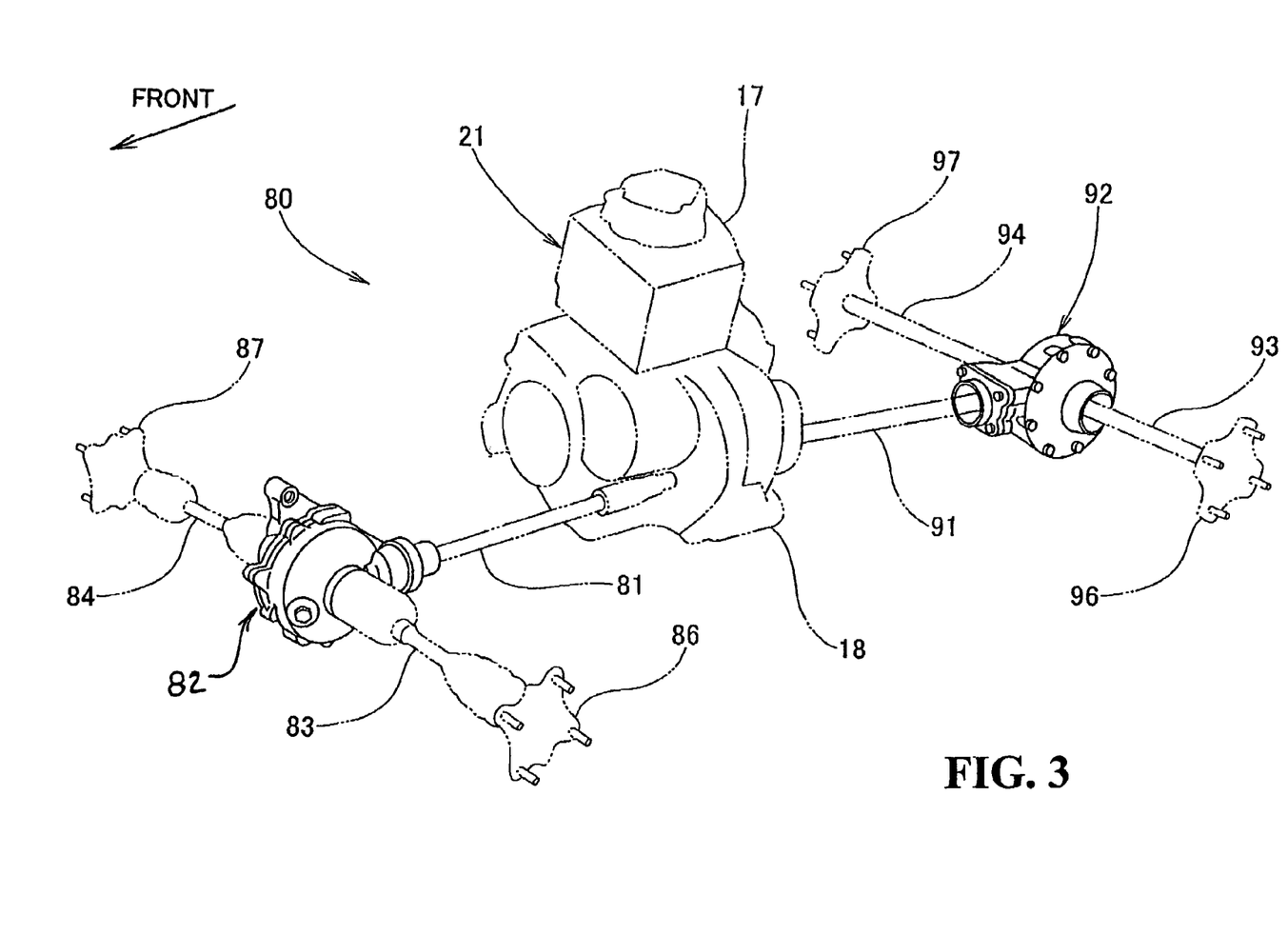
FIG. 3 is a perspective view showing a power transmission mechanism of the vehicle according to the invention.

FIG. 3 is a perspective view showing a power transmission mechanism of the vehicle according to the present invention. It should be noted that he arrow (FRONT) in FIG. 3 points at the front of the vehicle and it is similar in the following drawings.

The power transmission mechanism 80 is composed of a front propeller shaft 81 that extends forward from a lower part of the power unit 21. A front final assembly 82 is coupled to the end of the front propeller shaft 81. Front drive shafts 83, 84 are coupled to the left and the right of the front final assembly 82. Hubs 86, 87 are coupled to each end of the front drive shafts 83, 84. A rear propeller shaft 91 extends backward from the lower part of the power unit 21. A rear final assembly 92 is coupled to the rear end of the rear propeller shaft 91. Rear drive shafts 93, 94 are coupled to the left and the right of the rear final assembly 92. Hubs 96, 97 are coupled to each end of the rear drive shafts 93, 94.

The hubs 86, 87, 96, 97 are members for attaching the front wheels 12, 13 and the rear wheels 14, 15 respectively shown in FIG. 2.

Figure 4:
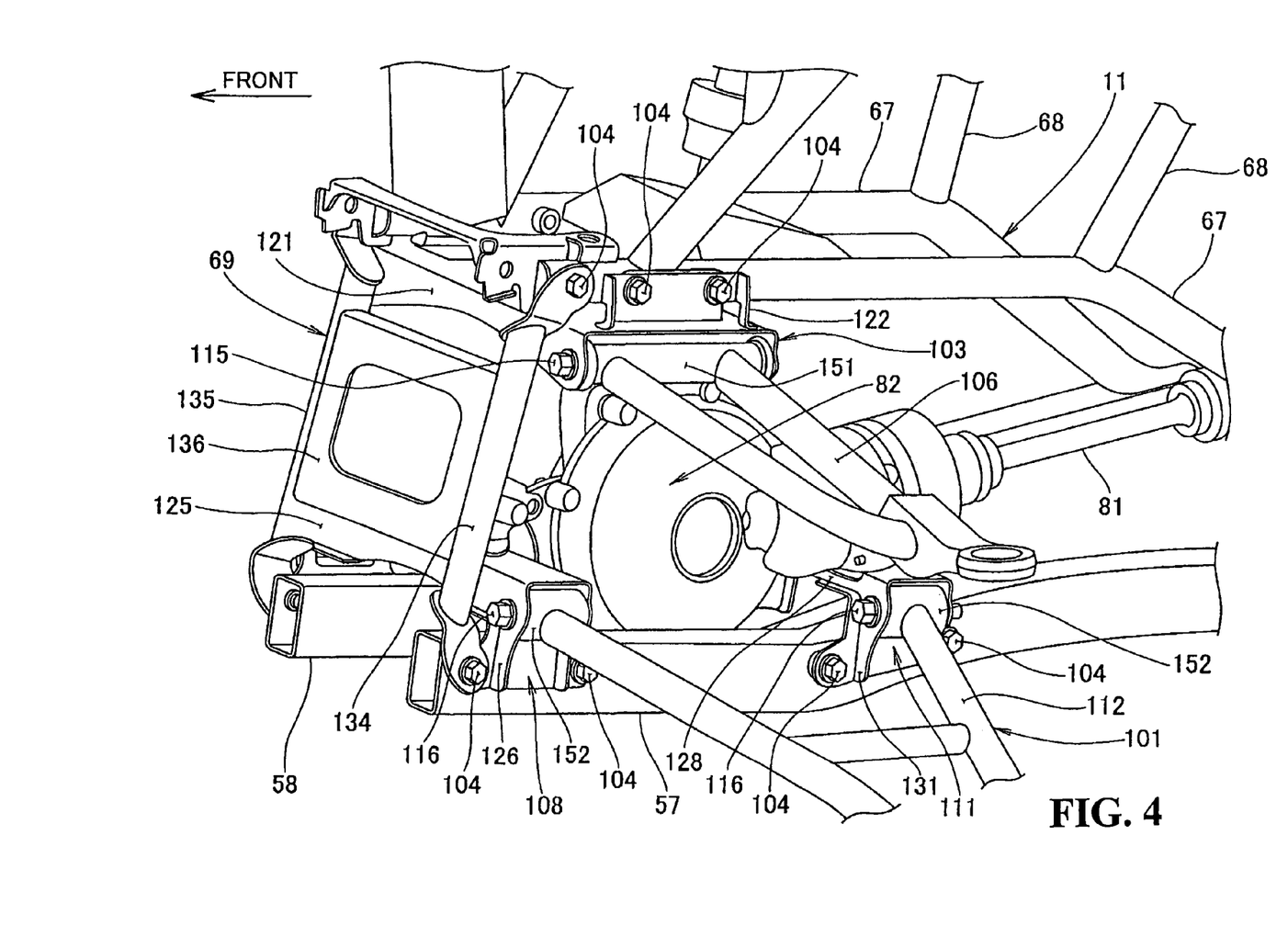
FIG. 4 is a perspective view showing suspension installation structure of the vehicle according to the invention.

FIG. 4 is a perspective view showing a suspension installation structure of the vehicle according to the present invention and shows an installation structure for attaching a suspension for the front wheels 101 as a double wishbone type suspension for supporting the front wheels 12, 13 (see FIG. 2) to the body frame 11.

FIG. 4 shows that the ends of the first inclined frames 67, 67 forming a part of the body frame 11 protrude forward like a cantilever. An upper bracket 103 extending in the width direction of the body is attached to each front end of the first inclined frames 67, 67 by bolts 104 as fasteners. A left upper arm 106 as a suspension arm and a right upper arm 107 (not shown) as a suspension arm respectively forming a part of the suspension for the front wheels 101 are attached to the left and the right of the upper bracket 103 so that the left and right upper arms can be vertically swung. The ends of the lower main frames 57, 58 forming a part of the body frame 11 protrude forward like a cantilever. A lower front bracket 108 and a lower rear bracket 111 respectively extending in the width direction of the body are attached to each front end of the lower main frames 57, 58 by bolts 104. A left lower arm 112 as a suspension arm and a right lower arm 113 (not shown) as a suspension arm respectively forming a part of the suspension for the front wheels 101 are attached to the left and the right of the lower front bracket 108 and the lower rear bracket 111 so that the left lower arm and the right lower arm can be vertically swung. Reference numerals 115, 115 (only the reference number on this side is shown) identify a bolt that functions as a swinging shaft of the left upper arm 106 and the right upper arm 107. Reference numerals 116 (only the reference number 116 on this side is shown) identify bolts that function as a swinging shaft of the left lower arm 112 and the right lower arm 113.

The upper bracket 103 is composed of the body 121 of the bracket that extends laterally to attach the left upper arm 106 and the right upper arm 107. A pair of left and right attachments on the frame side 122, 123 (only the reference number 122 on this side is shown) protrude upward from the body 121 to attach the body 121 to the first inclined frames 67, 67.

The lower front bracket 108 is composed of a laterally extended part 125 and downward extended parts 126, 126 (only the reference number 126 on this side is shown) acquired by integrally molding both ends of the laterally extended part 125 in a state in which they are bent downward. The downward extended parts 126, 126 are attached to the lower main frames 57, 58.

The lower rear bracket 111 is composed of a laterally extended part 128 and downward extended parts 131, 131 (only the reference number 131 on this side is shown) acquired by integrally molding both ends of the laterally extended part 128 in a state in which they are bent downward. The downward extended parts 131, 131 are attached to the lower main frames 57, 58.

The reference numeral 69 identifies the above-mentioned coupling member for coupling each end of the first inclined frames 67, 67 and each end of the lower main frames 57, 58. The coupling member is composed of a left coupling rod 134 attached to one first inclined frame 67 and the lower main frame 57 by bolts 104, 104. A right coupling rod 135 is attached to the other first inclined frame 67 and the lower main frame 58 by bolts 104, 104 (not shown). A coupling plate 136 is attached to the left coupling rod 134 and the right coupling rod 135.

Figure 5:
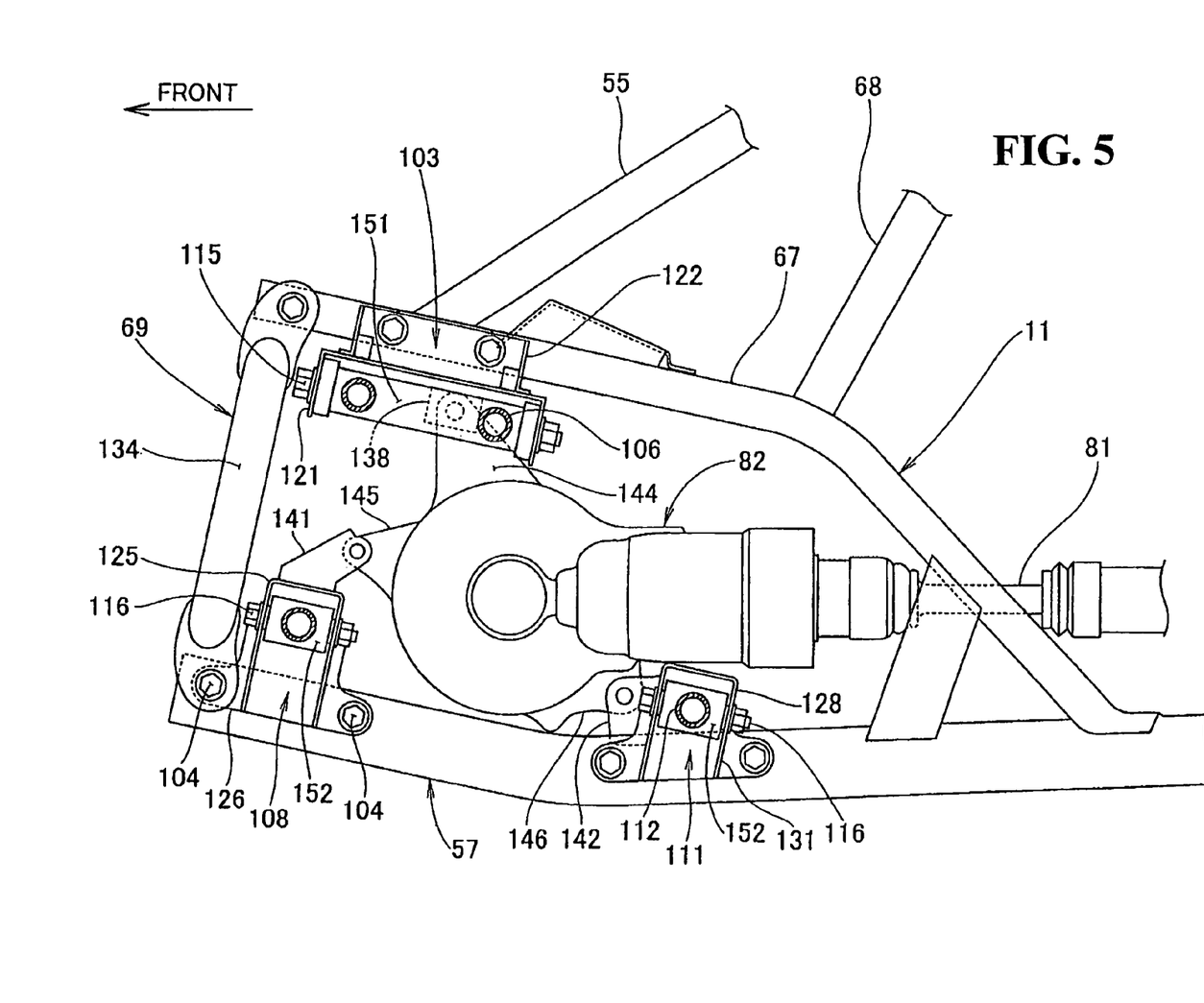
FIG. 5 is a side view showing the suspension installation structure of the vehicle according to the invention.

FIG. 5 is a side view showing the suspension installation structure of the vehicle according to the present invention, and shows that the front final assembly 82 is fixed to the body frame 11 by providing a downward protruded part 138 to the body 121, the section of which is U-shaped, of the upper bracket 103. An upward protruded part 141 is provided to the laterally extended part 125, the section of which is U-shaped, of the lower front bracket 108. A forward protruded part 142 is provided to the laterally extended part 128, the section of which is U-shaped, of the lower rear bracket 111. An upper attachment 144, a front attachment 145 and a lower attachment 146 are provided to the front final assembly 82. The upper attachment 144 is provided to the downward protruded part 138. The front attachment 145 is provided to the upward protruded part 141. Furthermore, the lower attachment 146 is provided to the forward protruded part 142.

The left coupling rod 134 and the right coupling rod 135 (see FIG. 4) respectively of the coupling member 69 are members, each lower end of which is jointly fastened to the lower main frames 57, 58 (see FIG. 4) by the lower front bracket 108 and the bolts 104, 104 (only the reference number 104 on this side is shown). Similarly, the right coupling rod 135 (see FIG. 4) of the coupling member 69 is a member, the lower end of which is jointly fastened to the lower main frame 58 (see FIG. 4) by the lower front bracket 108 and the bolt 104.

Reference numeral 151, 151 (only the reference number 151 on this side is shown) identifies an arm attachment provided to the left upper arm 106 and the right upper arm 107 to attach the left upper arm 106 and the right upper arm 107 to the upper bracket 103. Reference numerals 152 identify arm attachments provided to the left lower arm 112 and the right lower arm 113 to attach the left lower arm 112 and the right lower arm 113 to the lower front bracket 108 and the lower rear bracket 111.

A procedure for installing the above-mentioned suspension for the front wheels 101 onto the body frame 11 will be described below.

Figure 6:
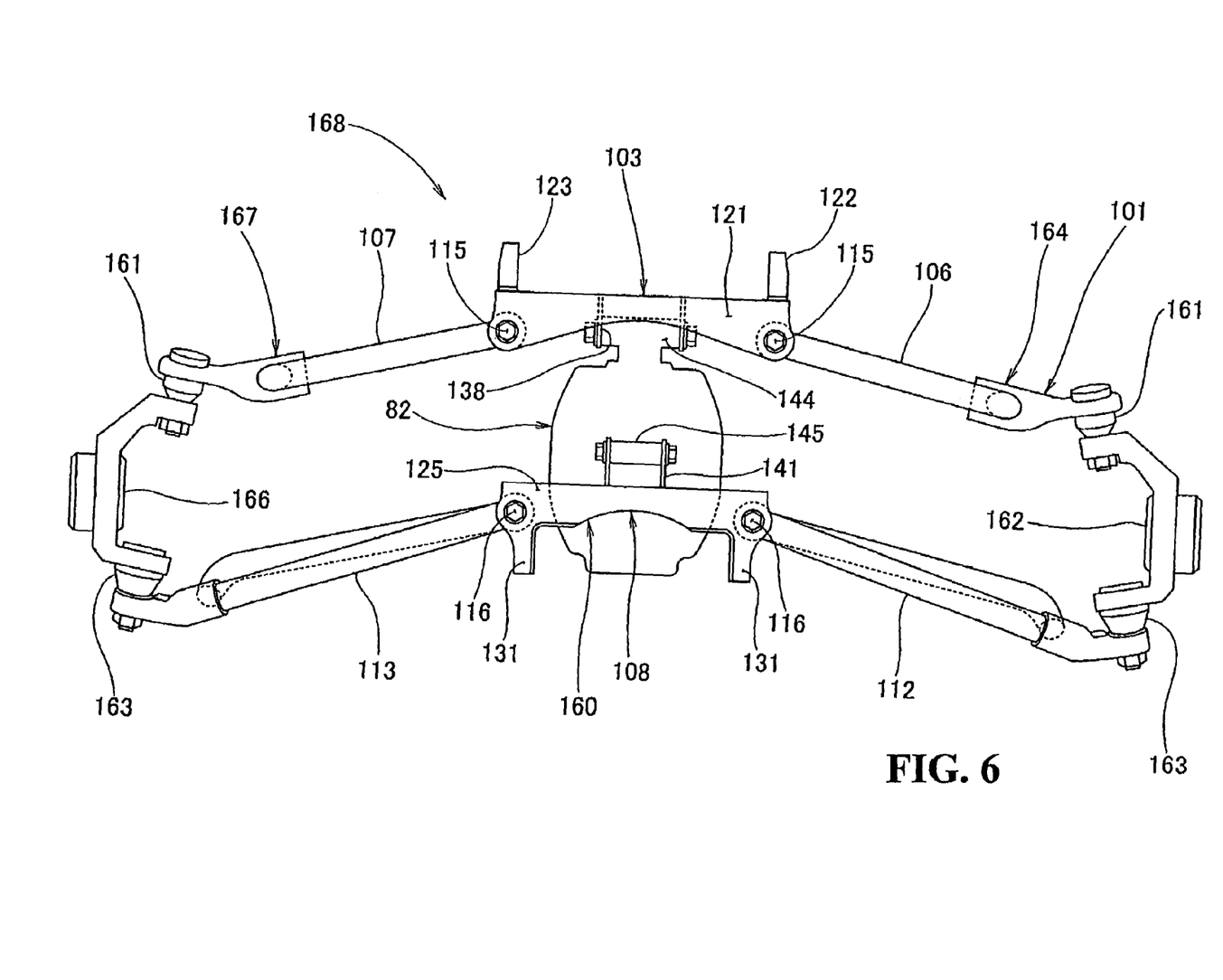
FIG. 6 shows a first action of a suspension installation procedure of the vehicle according to the invention.

FIG. 6 shows a first action (is a front view) of (showing) the procedure for installing the suspension of the vehicle according to the invention. First, a small assembly 160 is produced by attaching the upper bracket 103, the lower front bracket 108 and the lower rear bracket 111 (not shown) to the front final assembly 82.

In addition, a small assembly 164 is produced by attaching a left knuckle 162 to the left upper arm 106 via a ball joint 161 and by attaching the knuckle 162 to the left lower arm 112 via a ball joint 163.

Similarly, a small assembly 167 is produced by attaching a right knuckle 166 to the right upper arm 107 via a ball joint 161 and by attaching the right knuckle 166 to the right lower arm 113 via a ball joint 163.

The small assemblies 164, 167 are attached to each left and each right of the upper bracket 103, the lower front bracket 108 and the lower rear bracket 111.

A small assembly 168 composed of the small assemblies 160, 164, 167 is produced. The above-mentioned small assemblies 164, 167 form the suspension for the front wheels 101.

Figure 7:
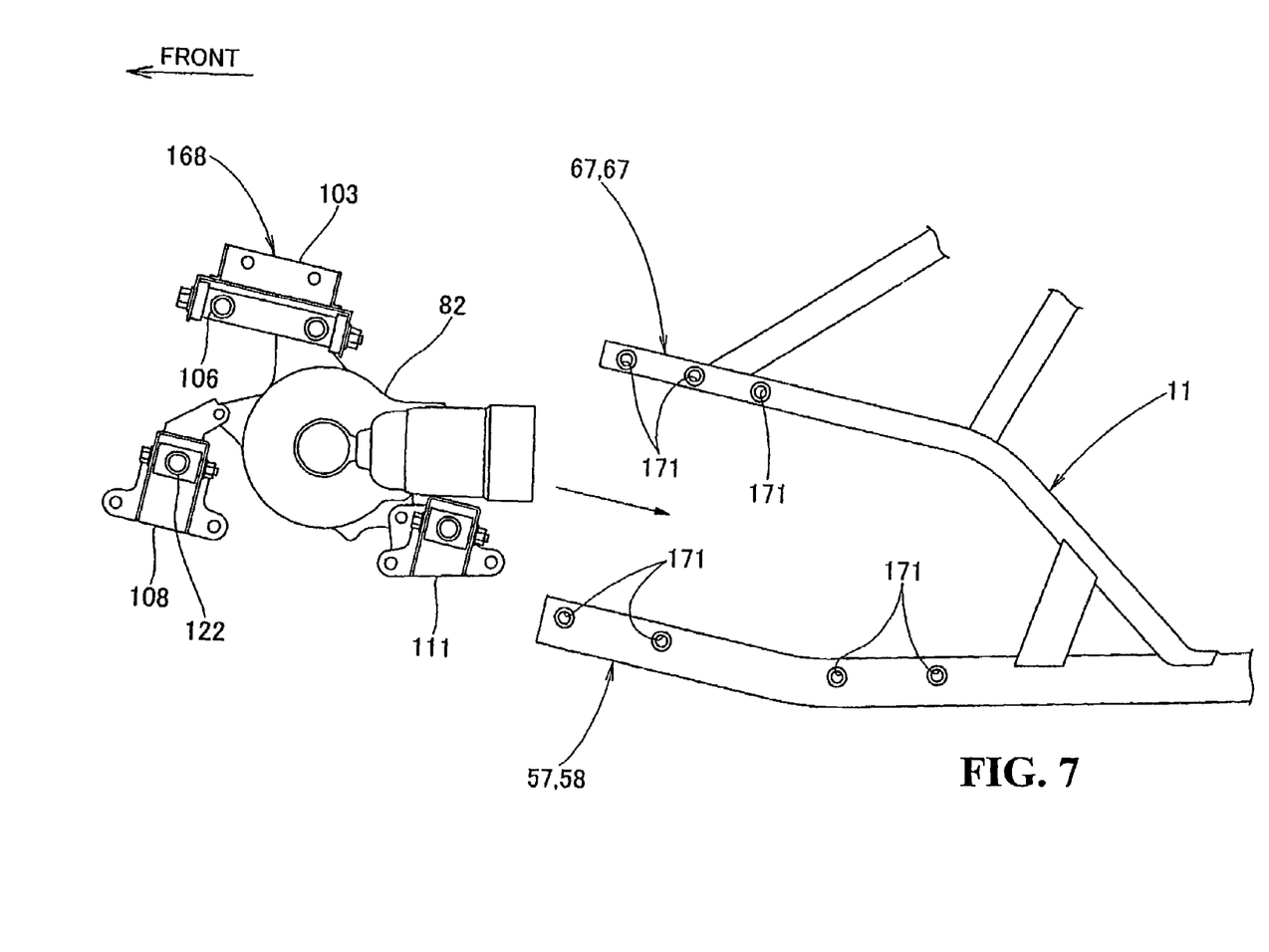
FIG. 7 shows a second action of the suspension installation procedure of the vehicle according to the invention.

FIG. 7 shows a second action of the procedure for installing the suspension of the vehicle according to the present invention.

The small assembly 168 is inserted into the body frame 11, that is, between the first inclined frames 67, 67 as a cantilever frame that protrudes toward the front of the vehicle and the lower main frames 57, 58 as a cantilever frame that similarly protrudes toward the front of the vehicle from the front of the vehicle as shown by an arrow. Reference numerals 171 identify bolt holes that have internal threads formed therein. Bolts 104 (see FIG. 4) are screwed into the bolt holes 171, respectively.

Figure 8:
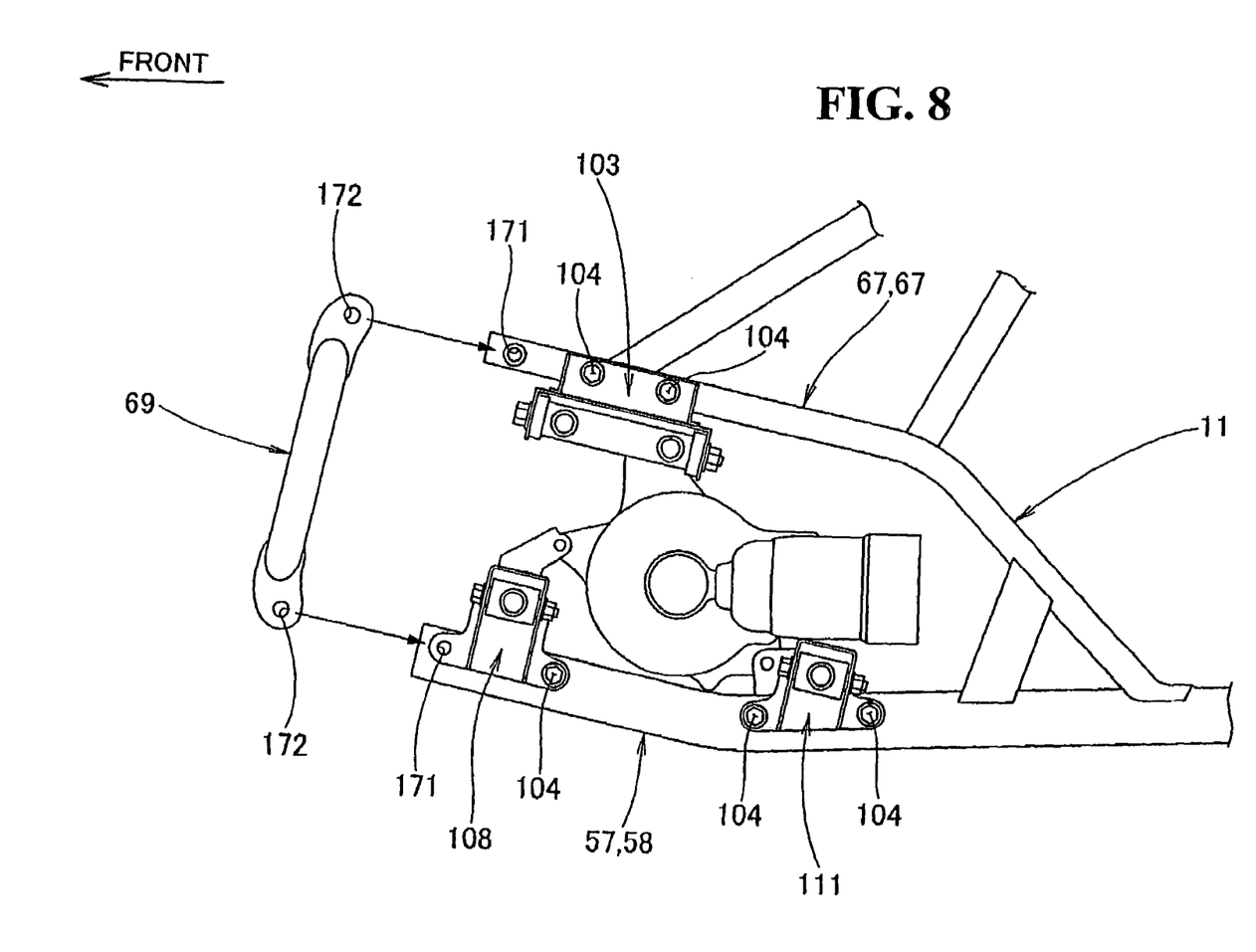
FIG. 8 shows a third action of the suspension installation procedure of the vehicle according to the invention.

FIG. 8 shows a third action of the procedure for installing the suspension of the vehicle according to the present invention.

Succeeding FIG. 7, the upper bracket 103 is attached to the first inclined frames 67, 67 by the bolts 104. The lower front bracket 108 and the lower rear bracket 111 are attached to the lower main frames 57, 58 by the bolts 104.

The coupling member 69 is then attached to the first inclined frames 67, 67 and the lower main frames 57, 58 by the bolt 104 (not shown) to couple the first inclined frames 67, 67 and the lower main frames 57, 58. Reference numerals 172 identify installation holes provided to the left coupling rod 134 and the right coupling rod 135 (not shown).

As described above, the suspension installation structure according to the present invention is acquired by making small modules of the small assemblies 160, 164, 167. A further larger module of the small assembly 168 is made as shown in FIG. 6. The suspension installation structure is improved so that it has a better shape, that is, a shape for enhancing productivity on the premise that the small assembly 168 is attached to the body frame 11 as shown in FIG. 7.

Compared with a case where the suspension is merely attached to the body frame via the brackets, the number of parts, the cost and the weight are reduced by integrating the parts (that is, by integrating the left and right brackets and a supporting member for supporting the front final assembly 82 as the upper bracket 103, the lower front bracket 108 and the lower rear bracket 111). Furthermore, the ease of assembly can be enhanced by changing the manufacturing method (that is, by changing the attachment of the brackets by welding to the fastening by the bolt 104).

As described above with reference to FIGS. 4, 6 and 7, the present invention is based upon a vehicle for running on an uneven road 10 (see FIG. 1) in which the left and right suspension arms (that is, the left upper arm 106, the right upper arm 107, the left lower arm 112 and the right lower arm 113) are attached to the body frame 11 via the brackets (that is, the upper bracket 103, the lower front bracket 108 and the lower rear bracket 111). The cantilever frames that protrude toward the front of the vehicle (or toward the rear of the vehicle)(that is, the first inclined frames 67, 67 and the lower main frames 57, 58) are provided to the body frame 11. The brackets 103, 108, 111 are fastened to the cantilever frames 67, 67, 57, 58 by the bolts 104.

If the brackets 103, 108, 111 and the suspension arms 106, 107, 112, 113 are assembled beforehand, the small assembly 168 acquired as a result can be easily attached to the body frame 11. Therefore, the ease of assembly in a main assembly line can be enhanced, and the productivity can be enhanced.

In addition, if the brackets 103, 108, 111 are attached to the cantilever frames 67, 67, 57, 58, the brackets 103, 108, 111 can also be attached from the front of the vehicle (or from the rear of the vehicle) in addition to the side of the vehicle. Therefore, the ease of assembly can be further enhanced.

Furthermore, according to another aspect of the present invention, a pair of left and right cantilever frames 67, 67, 57, 58 are provided. The brackets 103, 108, 111 are members that extend in the width direction of the body to attach the left and right suspension arms 106, 107, 112, 113 and are attached across the left and right cantilever frames 67, 67, 57, 58.

If the brackets 103, 108, 111 and the left and right suspension arms 106, 107, 112, 113 are assembled beforehand, the small assembly 168 acquired as a result can be attached to the left and right cantilever frames 67, 67, 57, 58 from the front of the vehicle (or from the rear of the vehicle). Therefore, the ease of assembly in the main assembly line can be more enhanced, and the productivity can be more enhanced.

According to a further aspect of the present invention, the cantilever frames 67 and 57 are arranged above and below on the left side, the cantilever frames 67 and 58 are arranged above and below on the right side, and the upper and lower cantilever frames 67, 67, 57, 58 are coupled by the coupling member 69.

Even if the cantilever frame structure is adopted, the rigidity of the body frame 11 can be secured by coupling the upper and lower cantilever frames 67, 67, 57, 58 by the coupling member 69 in addition to coupling the left and right cantilever frames 67, 67, 57 58 by the brackets 103, 108, 111. Therefore, the ease of assembly is further enhanced.

According to an additional aspect of the present invention, the suspension for the front wheels 101 is the double wishbone type suspension.

The upper arms (that is, the left upper arm 106 and the right upper arm 107) and the lower arms (that is, the left lower arm 112 and the right lower arm 113) forming the double wishbone type suspension 101 can be assembled together with the brackets 103, 108, 111 and the cantilever frame structure and the double wishbone type suspension 101 are an effective combination in terms of the ease of assembly.

In the embodiment of the invention, the suspension installation structure is applied to the suspension for the front wheels. However, the invention is not limited to this, since the suspension installation structure may be also applied to a suspension for rear wheels.

In addition, if the suspension installation structure is applied to the suspension for rear wheels, the ease of assembly can be further enhanced if a trailer hitch for example is assembled together with a coupling member for coupling upper and lower cantilever frames of the body frame.

The suspension installation structure of the vehicle according to the invention is suitable for a four-wheel vehicle in which a body frame longitudinally protrudes.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A suspension installation structure for a vehicle, the vehicle including left and right suspension arms attached to a body frame via a bracket, said suspension installation structure comprising:
   cantilever frames that protrude toward the front of the vehicle or toward the rear of the vehicle, said cantilever frames being provided on the body frame,
   wherein the bracket is fastened to the cantilever frames by fasteners; and
   further comprising:
   a coupling member having a coupling plate and a pair of coupling rods fastened to the cantilever frames in a position forward of a lateral extending part of the bracket.

2. The suspension installation structure for a vehicle according to claim 1, wherein a pair of right and left cantilever frames are provided, the bracket is a member that extends in a width direction of the body frame to attach right and left suspension arms, and the bracket is attached across the right and left cantilever frames.

3. The suspension installation structure for a vehicle according to claim 2, wherein upper and lower cantilever frames are arranged on the left side and upper and lower cantilever frames are arranged on the right side, and the upper and lower left cantilever frames and the upper and lower right cantilever frames are coupled by the coupling member.

4. The suspension installation structure for a vehicle according to claim 3, wherein the suspension is a double wishbone type.

5. The suspension installation structure for a vehicle according to claim 2, wherein the suspension is a double wishbone type.

6. The suspension installation structure for a vehicle according to claim 1, wherein the suspension is a double wishbone type.

7. The suspension installation structure for a vehicle according to claim 1, wherein the coupling member is arranged forward of a front final assembly.

8. A suspension structure for a vehicle, comprising:
   a pair of cantilever frames, said pair of cantilever frames being integral with a body frame of the vehicle;
   at least one bracket, said at least one bracket being removably mounted to said pair of cantilever frames;
   a pair of suspension arms, said pair of suspension arms being pivotally mounted to said bracket; and
   a coupling member having a pair of coupling rods fastened to the cantilever frames in positions forward of a lateral extending part of the at least one bracket.

9. The suspension structure for a vehicle according to claim 8, wherein said at least one bracket is a single bracket that extends in a width direction of the body frame to attach said pair of cantilever frames together, and said pair of suspension arms are right and left suspension arms that are attached to said single bracket.

10. The suspension structure for a vehicle according to claim 9, wherein there are a pair of upper cantilever frames and a pair of lower cantilever frames, said pair of upper cantilever frames and said pair of lower cantilever frames being coupled to each other by the coupling rods of the coupling member.

11. The suspension structure for a vehicle according to claim 10, wherein the suspension is a double wishbone type.

12. The suspension structure for a vehicle according to claim 9, wherein the suspension is a double wishbone type.

13. The suspension structure for a vehicle according to claim 8, wherein the suspension is a double wishbone type.

14. The suspension structure for a vehicle according to claim 8, wherein the wherein the coupling member is arranged forward of a front final assembly.

15. A method of installing a suspension onto a body frame of a vehicle, said method comprising the steps of:
   producing a first small assembly by attaching an upper bracket, a lower front bracket and a lower rear bracket to a final assembly of the vehicle;
   producing a second small assembly by attaching a left upper suspension arm to a left lower suspension arm;
   producing a third small assembly by attaching a right upper suspension arm to a right lower suspension arm;
   producing a fourth small assembly by attaching the second small assembly to a left of the first small assembly and attaching the third small assembly to a right of the first small assembly;
   inserting the fourth small assembly between a pair of upper cantilever frames and a pair of lower cantilever frames of the body frame of the vehicle; and
   attaching the fourth small assembly to the pairs of cantilever frames with removable fasteners.

16. The method according to claim 15, further comprising the step of attaching a coupling member to said pairs of cantilever frames with removable fasteners.

17. The method according to claim 15, wherein said step of producing the first small assembly further comprises the step of attaching centers of each of the upper bracket, the lower front bracket and the lower rear bracket to the final assembly of the vehicle such that each of the upper bracket, the lower front bracket and the lower rear bracket have left and right free ends.

18. The method according to claim 17, wherein said step of producing said second small assembly further comprises the steps of attaching the left upper suspension arm to a left knuckle via a first ball joint and attaching the left lower suspension arm to the left knuckle via a second ball joint, and said step of producing said third small assembly further comprises the steps of attaching the right upper suspension arm to a right knuckle via a third ball joint and attaching the right lower suspension arm to the right knuckle via a fourth ball joint.

19. The method according to claim 18, wherein said step of producing the fourth small assembly further comprises the steps of:
   attaching the left upper suspension arm to the left free end of the upper bracket;
   attaching the left lower suspension arm to the left free ends of the lower front bracket and the lower rear bracket;

attaching the right upper suspension arm to the right free end of the upper bracket; and attaching the right lower suspension arm to the right free ends of the lower front bracket and the lower rear bracket.

20. The method according to claim 17, wherein said step of producing the fourth small assembly further comprises the steps of:

attaching the left upper suspension arm to the left free end of the upper bracket;

attaching the left lower suspension arm to the left free ends of the lower front bracket and the lower rear bracket;

attaching the right upper suspension arm to the right free end of the upper bracket; and attaching the right lower suspension arm to the right free ends of the lower front bracket and the lower rear bracket.

* * * * *